United States Patent
Brand et al.

(10) Patent No.: US 11,148,796 B2
(45) Date of Patent: Oct. 19, 2021

(54) TAIL ROTOR ASSEMBLY

(71) Applicant: Bell Helicopter Textron Inc., Fort Worth, TX (US)

(72) Inventors: Albert Gerard Brand, North Richland Hills, TX (US); Eric Albert Sinusas, Euless, TX (US)

(73) Assignee: Textron Innovations Inc., Providence, RI (US)

( * ) Notice: Subject to any disclaimer, the term of this patent is extended or adjusted under 35 U.S.C. 154(b) by 752 days.

(21) Appl. No.: 16/007,666

(22) Filed: Jun. 13, 2018

(65) Prior Publication Data
US 2019/0382109 A1    Dec. 19, 2019

(51) Int. Cl.
*B64C 27/82* (2006.01)

(52) U.S. Cl.
CPC ...... *B64C 27/82* (2013.01); *B64C 2027/8218* (2013.01); *B64C 2027/8227* (2013.01); *B64C 2027/8254* (2013.01)

(58) Field of Classification Search
CPC ............ B64C 27/82; B64C 2027/8218; B64C 2027/8227; B64C 2027/8254
See application file for complete search history.

(56) References Cited

U.S. PATENT DOCUMENTS

| | | | |
|---|---|---|---|
| 2,420,784 A * | 5/1947 | Larsen | B64C 27/82 244/17.21 |
| 2,491,549 A | 12/1949 | Brewster, III | |
| 3,179,353 A * | 4/1965 | Peterson | B64C 29/0025 244/12.3 |
| 4,531,692 A | 7/1985 | Mateus | |
| 4,768,737 A * | 9/1988 | Broadley | B64C 27/82 244/17.21 |
| 5,108,044 A | 4/1992 | Weiner et al. | |

(Continued)

FOREIGN PATENT DOCUMENTS

| | | |
|---|---|---|
| FR | 3014837 A1 | 6/2015 |
| JP | H07156890 A | 6/1995 |

OTHER PUBLICATIONS

European Search Report in related European Patent Application No. 19179151.6 dated Nov. 14, 2019, 4 pages.

(Continued)

*Primary Examiner* — Brian M O'Hara
*Assistant Examiner* — Keith L Dixon
(74) *Attorney, Agent, or Firm* — Lightfoot & Alford PLLC

(57) ABSTRACT

Systems and methods include providing a helicopter, with a fuselage, a tail boom extending from the fuselage, a main rotor system, and a tail rotor assembly disposed on an aft end of the tail boom. The tail rotor assembly includes a tail rotor housing, at least one normal ducted fan that generate anti-torque thrust to prevent rotation of the fuselage, and at least one canted ducted fan configured to generate both anti-torque thrust to prevent of the fuselage and lift to the tail boom in order to control the pitch of the helicopter. The canted ducted fans generate sufficient lift to prevent a nose-up orientation of the helicopter when the center of gravity of the helicopter is shifted rearward behind the main rotor system, while the normal ducted fans maintain sufficient anti-torque thrust to prevent rotation of the fuselage when the main rotor is operated.

20 Claims, 6 Drawing Sheets

(56) References Cited

U.S. PATENT DOCUMENTS

| | | | | | |
|---|---|---|---|---|---|
| 5,240,205 | A | * | 8/1993 | Allongue | B64C 27/82 |
| | | | | | 244/17.19 |
| 5,505,407 | A | * | 4/1996 | chiappetta | B64C 29/0025 |
| | | | | | 244/2 |
| 2014/0326826 | A1 | * | 11/2014 | Certain | B64C 27/467 |
| | | | | | 244/17.21 |
| 2016/0221675 | A1 | * | 8/2016 | Adam | B64C 27/82 |
| 2017/0349276 | A1 | * | 12/2017 | Fenny | H02K 7/116 |

OTHER PUBLICATIONS

European Exam Report in related European Patent Application No. 19179151.6 dated Nov. 26, 2019, 7 pages.

\* cited by examiner

TAIL ROTOR ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

In flight, aircraft are subjected to various aerodynamic forces as a result of the design, flight characteristics, and operating parameters of a particular aircraft. Environmental factors also play a role in the aerodynamic forces experienced by an aircraft. Rotorcraft are particularly sensitive to such aerodynamic forces since rotorcraft have not only forward flight capability, but also hover, rearward, and lateral mobility. Additionally, since the center of gravity of a rotorcraft affects the pitch attitude of the rotorcraft, most conventional rotorcraft (single main rotor) are designed with the center of gravity almost coincidental with the main rotor mast of the rotorcraft, whether the rotorcraft is in an unloaded or loaded state. When a rotorcraft carries additional payload, the pilot must take care to keep the center of gravity within accepted bounds identified by the flight manual, otherwise the ability to control the rotorcraft will be at risk due to reduced control margin.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
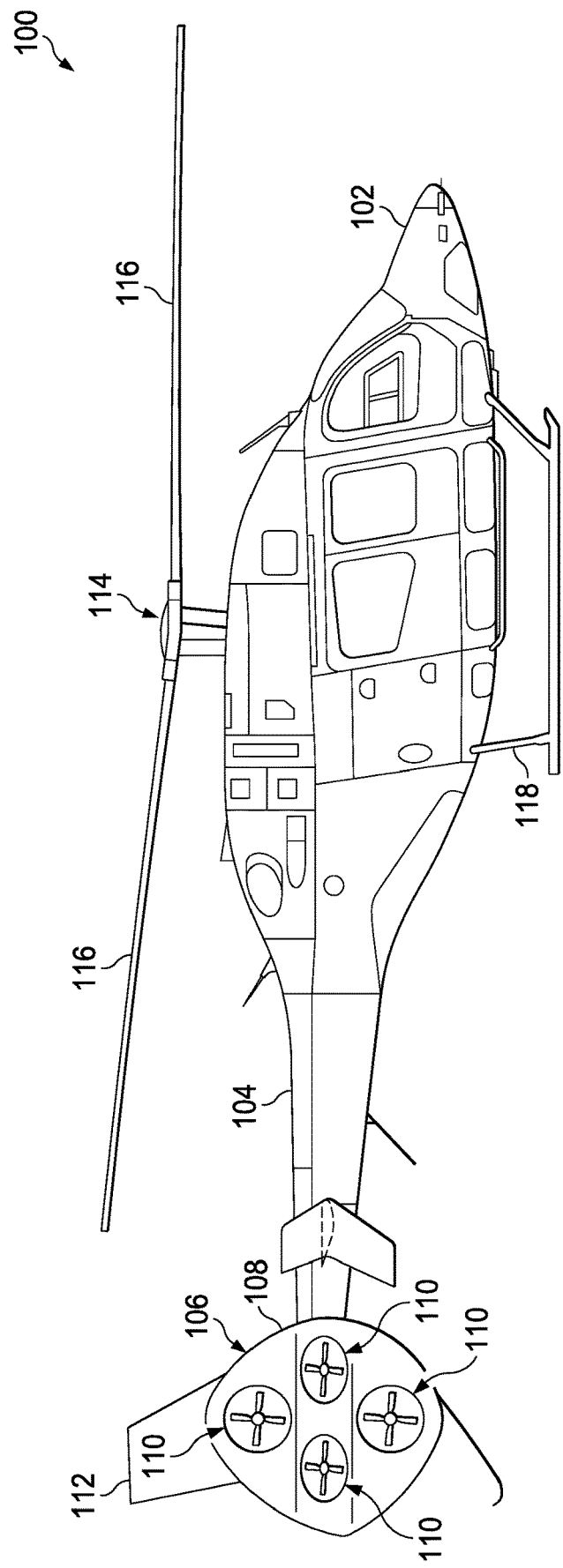
FIG. 1 is a side view of a helicopter according to this disclosure.

Referring to FIG. 1, a side view of a helicopter 100 is shown. Helicopter 100 comprises a fuselage 102 and an empennage or tail boom 104. Helicopter 100 also comprises a tail rotor assembly 106 disposed on an aft end of the tail boom 104. The tail rotor assembly 106 comprises a tail rotor housing 108 and a plurality of ducted fans 110. In some embodiments, the tail rotor assembly 106 may also comprise a vertical stabilizer 112. Helicopter 100 further comprises a main rotor system 114 having a plurality of main rotor blades 116 that are selectively rotatable to provide vertical lift to the helicopter 100. A landing gear or skid 118 is attached to the fuselage 102 and configured to support the helicopter 100 when the helicopter 100 is grounded. While not shown, helicopter 100 also comprises a flight control system, which may, for example, include hardware (e.g., cyclic control, collective control, pedals, etc.) and/or software for controlling the helicopter 100 during operation. Additionally, while not shown, helicopter 100 may also comprise a combustion engine or other source of mechanical energy.

Figure 2:
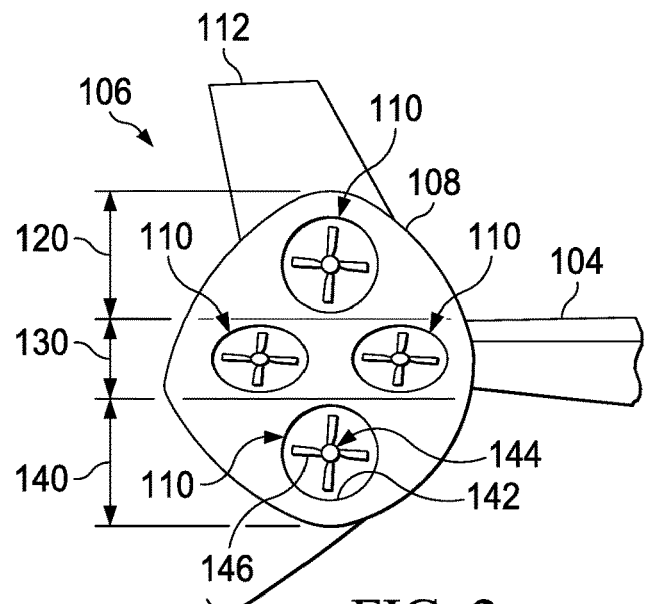
FIG. 2 is a side view of a tail rotor assembly of the helicopter of FIG. 1.
Figure 3:
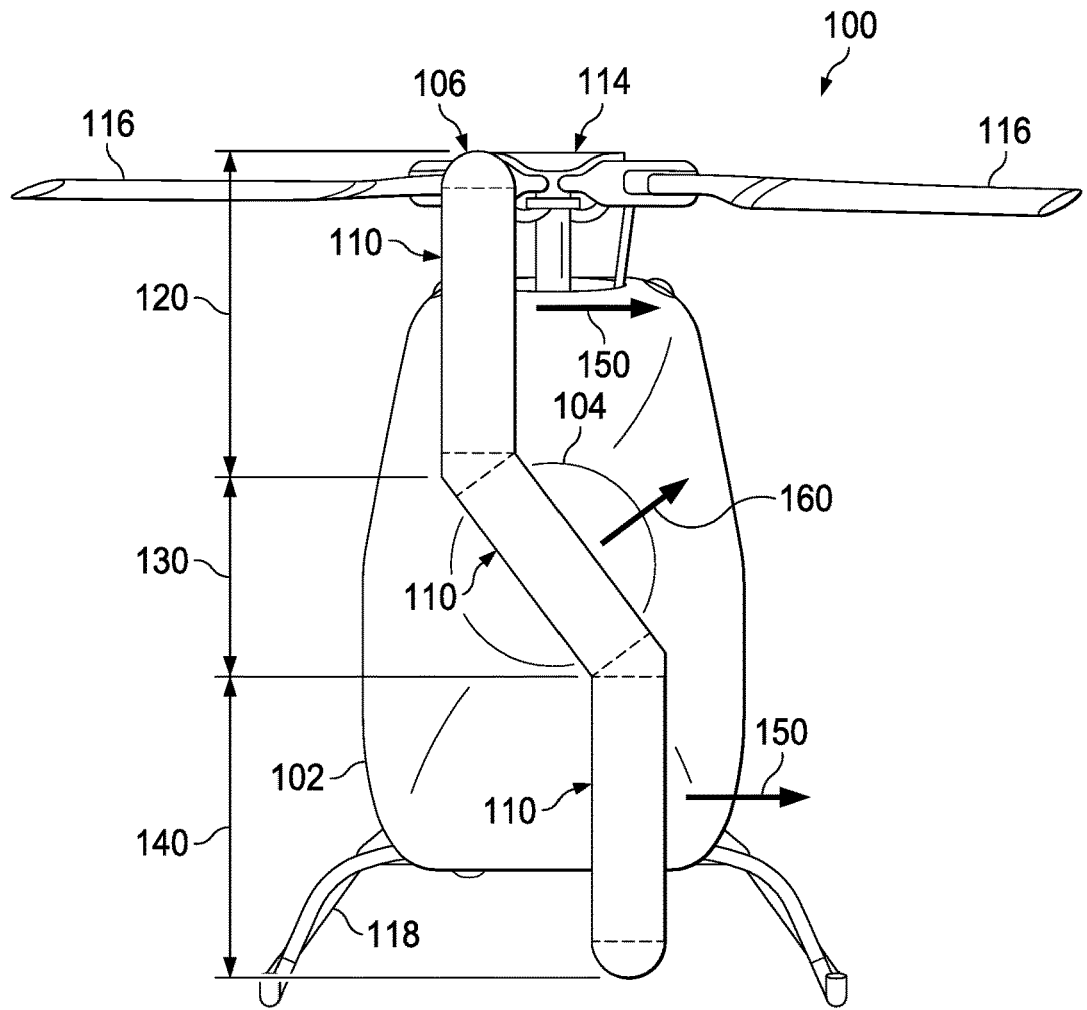
FIG. 3 is a rear view of the tail rotor assembly of FIG. 2.

Referring to FIGS. 2 and 3, a side view and a rear view of the tail rotor assembly 106 of helicopter 100 are shown, respectively. Tail rotor assembly 106 comprises a tail rotor housing 108 and a plurality of ducted fans 110. Additionally, in some embodiments, the tail rotor assembly 106 may also comprise a vertical stabilizer 112. The tail rotor housing 108 may generally comprise an aerodynamically preferable shape or profile (e.g., low drag in forward flight). In the embodiment shown, the tail rotor housing 108 comprises an upper normal section 120 comprising one ducted fan 110, a middle canted section 130 comprising two ducted fans 110, and a lower normal section 140 comprising one ducted fan 110. In other embodiments, each of the upper normal section 120, middle canted section 130, and the lower normal section 140 may comprise any number of ducted fans 110. Additionally, in some embodiments, the tail rotor housing 108 may not comprise the upper normal section 120 or the lower normal section 140, such that the tail rotor housing 108 comprises only one normal section and one canted section.

Each ducted fan 110 generally comprises an aperture or duct 142 disposed through the tail rotor housing 108 and a thrust rotor 144 comprising a plurality of thrust rotor blades 146 disposed within the duct 142. In the embodiment shown, the ducted fans 110 are electric fans comprising electric motors. However, in other embodiments, the ducted fans 110 may be mechanically driven fans. The ducted fans 110 in the upper normal section 120 and the lower normal section 140 may be referred to as normal fans that are configured to generate right sideward thrust to the tail boom 104 as shown by thrust vectors 150 in order to provide anti-torque thrust to prevent rotation of the fuselage 102 when the main rotor 114 is operated. The ducted fans 110 in the middle canted section 130 may be referred to as canted fans that are configured to generate upward angled thrust to the tail boom 104 as shown by thrust vector 160 in order to at least partially provide anti-torque thrust to prevent rotation of the fuselage 102 when the main rotor 114 is operated and to further provide lift to the tail boom 104 in order to control the pitch attitude of the helicopter 100. As such, in the embodiment shown, tail rotor assembly 106 comprises an equal number of normal fans and canted fans.

In operation, the ducted fans 110 in each section 120, 130, 140 may be controlled manually by a pilot of the helicopter 100 and/or automatically by a control system (e.g., flight control system 308 in FIGS. 6A-6E) of helicopter 100. In some embodiments, the ducted fans 110 in each section 120, 130, 140 may be automatically controlled in response to the center of gravity and/or a change in the center of gravity (e.g., as detected by sensors 306 in FIGS. 6A-6E) of helicopter 100. Each section 120, 130, 140 of ducted fans 110 may be independently controlled and operated. As such, in some embodiments, ducted fans 110 in one or more sections 120, 130, 140 may be operated while ducted fans 110 in other sections 120, 130, 140 may not be operated, or alternatively, may operate at a minimal rotational speed to provide negligible anti-torque thrust and/or lift. Additionally, when ducted fans 110 in multiple sections 120, 130, 140 are operated simultaneously, the rotational speed of the ducted fans 110 in each section 120, 130, 140 may be independently controlled. Further, one skilled in the art will recognize that increases and decreases in rotational speed of the ducted fans 110 directly correlate to increases and decreases in the amount of thrust generated, respectively.

More specifically, depending on the payload carried by the helicopter 100 and/or the required pitch of the helicopter 100, the amount of lift generated by the ducted fans 110 in the middle canted section 130 may be selectively controlled. However, since all ducted fans 110 share in generating anti-torque thrust, selectively adjusting the amount of lift generated by the ducted fans 110 in the middle canted section 130 also changes the overall anti-torque thrust generated by the tail rotor assembly 106. Accordingly, the amount of anti-torque thrust generated by the ducted fans 110 in the upper normal section 120 and the lower normal section 140 may be simultaneously controlled to regulate the amount of anti-torque thrust imparted on the tail boom 104 of the helicopter 100. Thus, when additional lift to the tail boom 104 is required to pitch the helicopter 100 forward, thrust generated by the ducted fans 110 in the middle canted section 130 may be increased, while the thrust generated by the ducted fans 110 in the upper normal section 120 and the lower normal section 140 may be decreased. Alternatively, when less tail lift is required, thrust generated by the ducted fans 110 in the middle canted section 130 may be decreased, while the thrust generated by the ducted fans 110 in the upper normal section 120 and the lower normal section 140 may be increased so as to maintain the overall anti-torque thrust generated by the tail rotor assembly 106.

Figure 4:
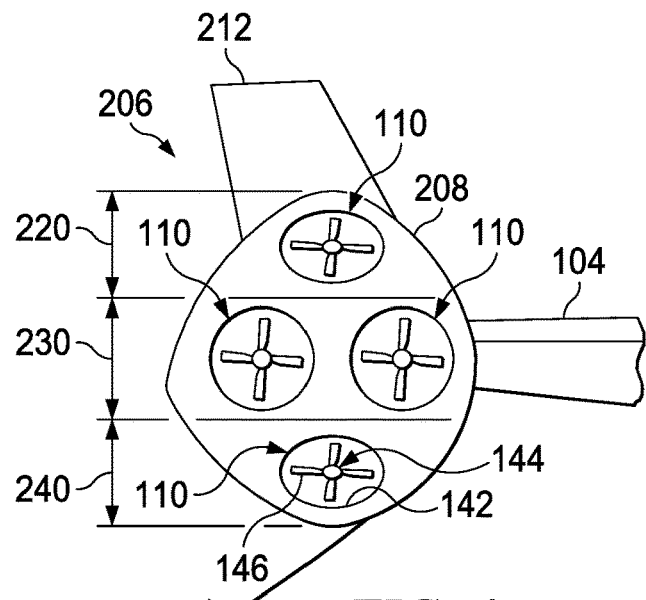
FIG. 4 is a side view of another embodiment of a tail rotor assembly of the helicopter of FIG. 1.
Figure 5:
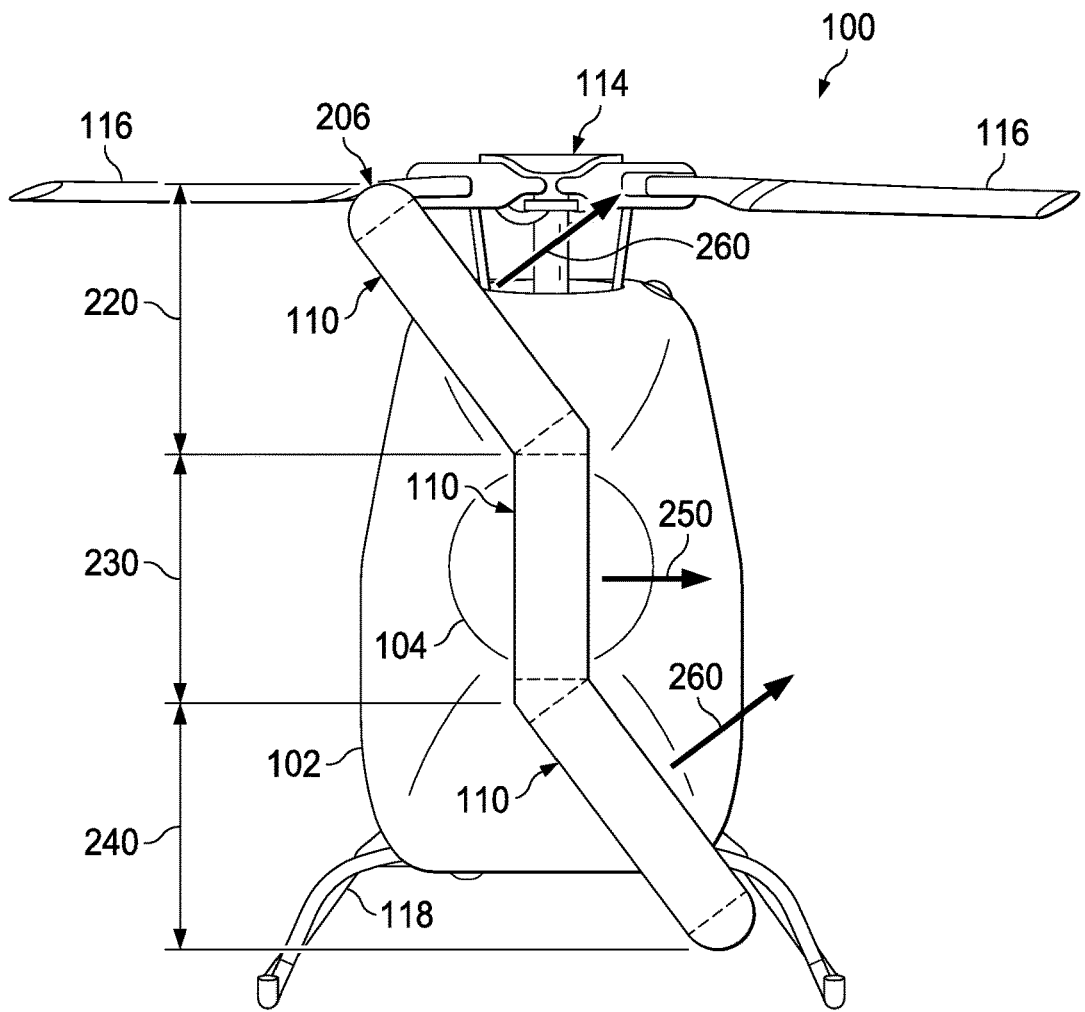
FIG. 5 is a rear view of the tail rotor assembly of FIG. 4.

Referring to FIGS. 4 and 5, a side view and a rear view of an alternative embodiment of a tail rotor assembly 206 of helicopter 100 are shown, respectively. Tail rotor assembly 206 is generally substantially similar to tail rotor assembly 106 and configured to be controlled and operated in a substantially similar manner to tail rotor assembly 106. Tail rotor assembly 206 comprises a tail rotor housing 208 comprising an aerodynamically preferable shape or profile (e.g., airfoil) and a plurality of ducted fans 110. Each ducted fan 110 comprises a duct 142 disposed through the tail rotor housing 108 and a thrust rotor 144 comprising a plurality of thrust rotor blades 146 disposed within the duct 142. Additionally, in some embodiments, the tail rotor assembly 206 may also comprise a vertical stabilizer 212. In the embodiment shown, tail rotor housing 208 comprises an upper canted section 220 comprising one ducted fan 110, a middle normal section 230 comprising two ducted fans 110, and a lower canted section 240 comprising one ducted fan 110. In other embodiments, each of the upper canted section 220, middle normal section 230, and the lower canted section 240 may comprise any number of ducted fans 110. Additionally, in some embodiments, the tail rotor housing 208 may not comprise the upper canted section 220 or the lower canted section 240, such that the tail rotor housing 208 comprises only one normal section and one canted section.

The ducted fans 110 in the middle normal section 230 are normal fans that are typically configured to generate right sideward thrust to the tail boom 104 as shown by thrust vector 250 in order to provide anti-torque thrust to prevent rotation of the fuselage 102 when the main rotor 114 is operated. It will be appreciated that for a main rotor 114 that rotates in the opposite direction from that shown in FIGS. 3 and 5, the configuration of the tail rotor assembly 116 would be mirrored to provide the appropriate anti-torque. The ducted fans 110 in the upper canted section 220 and the lower canted section 240 are canted fans that are configured to generate upward angled thrust to the tail boom 104 as shown by thrust vectors 260 in order to at least partially provide anti-torque thrust to prevent rotation of the fuselage 102 when the main rotor 114 is operated and to further provide lift to the tail boom 104 in order to control the pitch of the helicopter 100. As such, in the embodiment shown, tail rotor assembly 206 comprises an equal number of normal fans and canted fans. Similar to tail rotor assembly 106, all ducted fans 110 share in generating anti-torque thrust. As such, in a manner substantially similar to tail rotor assembly 106, it will be appreciated that the amount of lift generated by the ducted fans 110 in the upper canted section 220 and the lower canted section 240 of tail rotor assembly 206 may be selectively controlled to adjust pitch attitude of the helicopter 100, while the amount of anti-torque thrust generated by the ducted fans 110 in the middle normal section 230 of tail rotor assembly 206 may be simultaneously controlled to regulate the amount of anti-torque thrust imparted to the tail boom 104 to prevent rotation of the fuselage 102 of the helicopter 100.

Figure 6A:
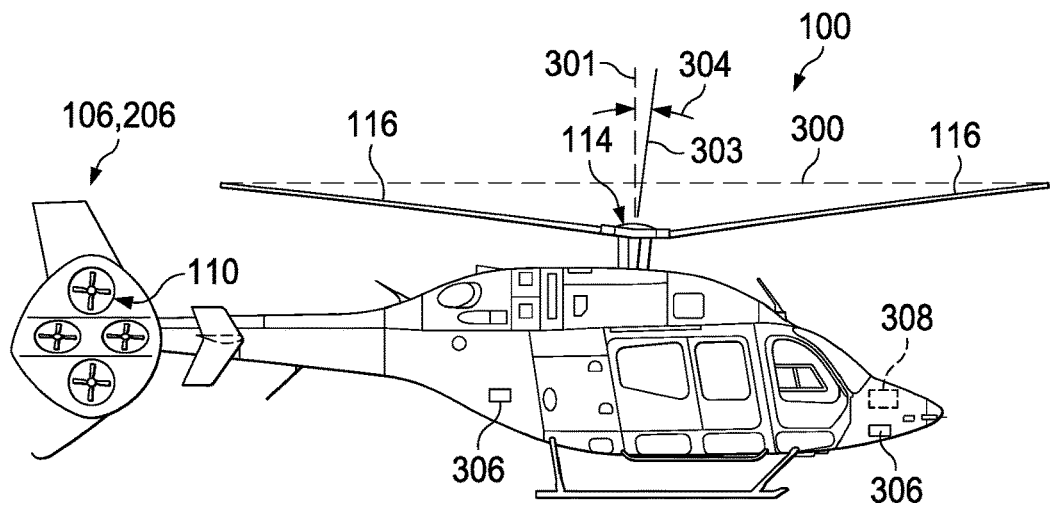
FIG. 6A is a simplified diagram of the helicopter of FIG. 1 operating in an unloaded hovering state.

Referring to FIGS. 6A-6E, simplified diagrams of helicopter 100 operating in an unloaded hovering state, an aft loaded state that would result in rearward flight, the aft loaded state with the pilot recovering a hover condition by applying forward cyclic to the main rotor system 114, in the aft loaded state with the tail rotor assembly 106, 206 operating to apply additional tail lift in order to recover available cyclic control, increase payload capacity, and minimize forward flapping of the main rotor system 114, and in the aft loaded state with the tail rotor assembly of the helicopter operating to apply additional tail lift in order to orient the helicopter in a more nose-down orientation for forward flight, respectively. As shown in FIG. 6A, helicopter 100 is operating in a steady state hover or forward flight in an unloaded (no additional payload) state. As such, no additional lift is required from canted fans in the tail rotor assembly 106, 206. However, in some embodiments, it will be appreciated that helicopter 100 may be designed such that the canted fans in the tail rotor assembly 106, 206, while not required to manage the center of gravity of helicopter 100, are still available to provide pitch attitude control to the pilot in any flight condition. The region swept by the tip of the main rotor blades 116 is referred to as the rotor tip path plane 300 and is substantially horizontal in a zero wind hover. Additionally, in the zero wind hover in an unloaded state, a rotor mast axis 303 of the main rotor system 114 may be angled forward from a tip path plane axis 301, thereby forming rotor plane flapping angle 304.

Figure 6B:
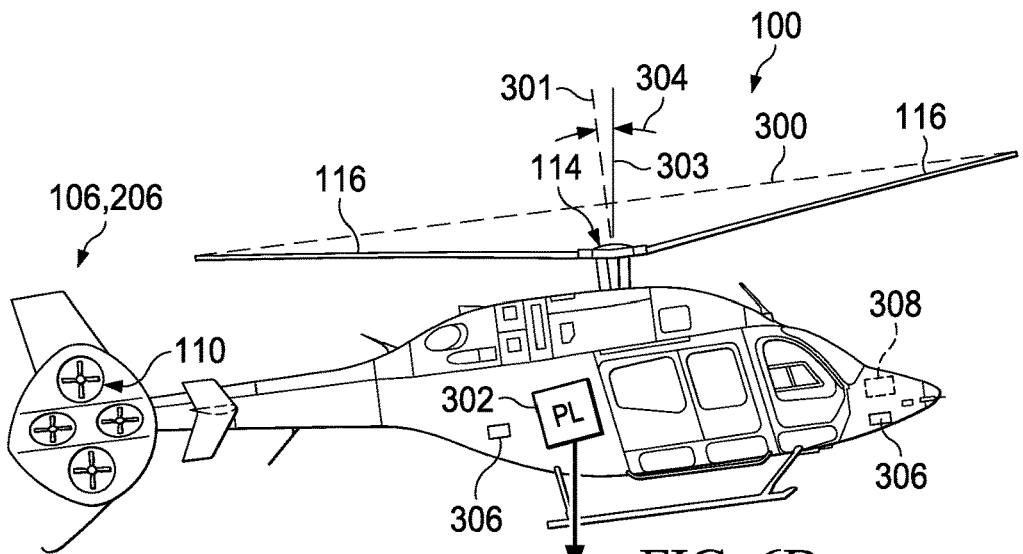
FIG. 6B is a simplified diagram of the helicopter of FIG. 1 operating in an aft loaded state.
Figure 6C:
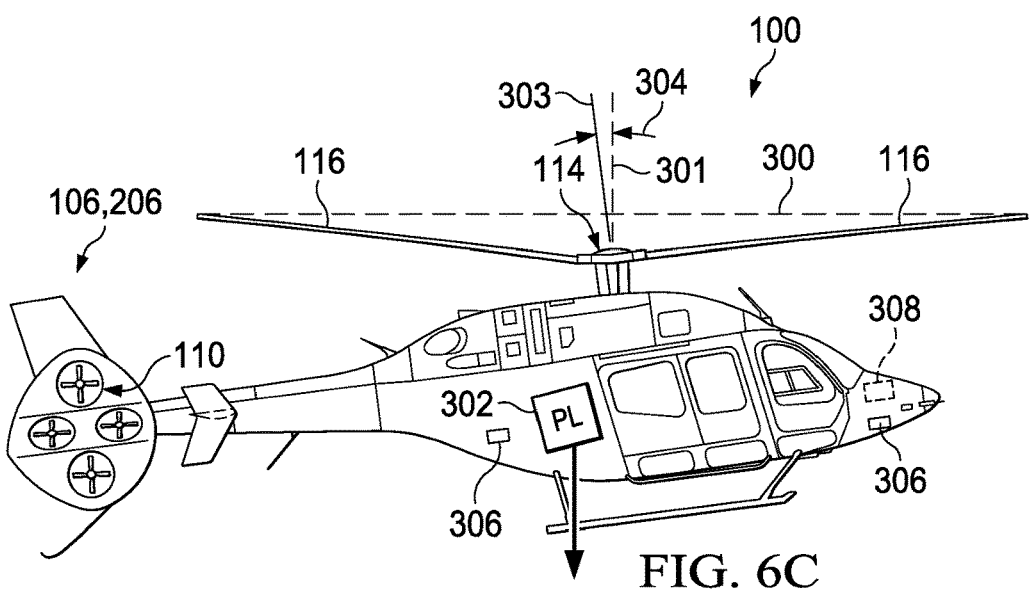
FIG. 6C is a simplified diagram of the helicopter of FIG. 1 operating in the aft loaded state with the pilot recovering a hover condition by applying forward cyclic to a main rotor system of the helicopter.

As shown in FIG. 6B, additional aft payload 302 has been added to the helicopter 100 or an aft shift in the payload 302 has occurred. For a helicopter 100 having a single main rotor 114, the aft center of gravity causes a nose up pitch attitude, that would cause rearward flight if not addressed or reacted to by the pilot. To maintain hover, the pilot must provide a forward cyclic control input to return the rotor tip path plane 300 to horizontal (as shown in FIG. 6C). This response is necessary whenever helicopter 100 takes on additional payload 302 (e.g., rear-seated passengers, cargo, etc.) behind the main rotor system 114 and/or the center of gravity, or a payload 302 shifts the center of gravity rearward. A similar response occurs for payloads with a forward center of gravity shift. A shift in the center of gravity will change the fuselage pitch and may be detected by the pilot or sensors 306 as the helicopter 100 pitches upward (or downward). The use of sensors 306 would allow an automated system to apply appropriate cyclic control input to maintain a steady state hover or a given forward flight condition.

The additional forward cyclic control input due to an aft center of gravity can lead to two undesirable effects. First, the amount of forward control margin available to maneuver is reduced. Second, an increased degree of flapping, shown by rotor plane flapping angle 304, between the orientation of the rotor mast axis 303 of the main rotor system 114 and the rotor tip path plane 300 can prematurely wear out components of the main rotor system 114. Additionally, most rotorcraft, such as helicopter 100, are limited to about five degrees of flapping, since a hub design that accommodates high degrees of flapping 304 is more complex and expensive. With the ducted fans 110 available, tail lift can be provided by the tail rotor assembly 106, 206 to mitigate the amount of flapping and increase the performance of helicopter 100 when carrying additional payload 302.

Figure 6D:
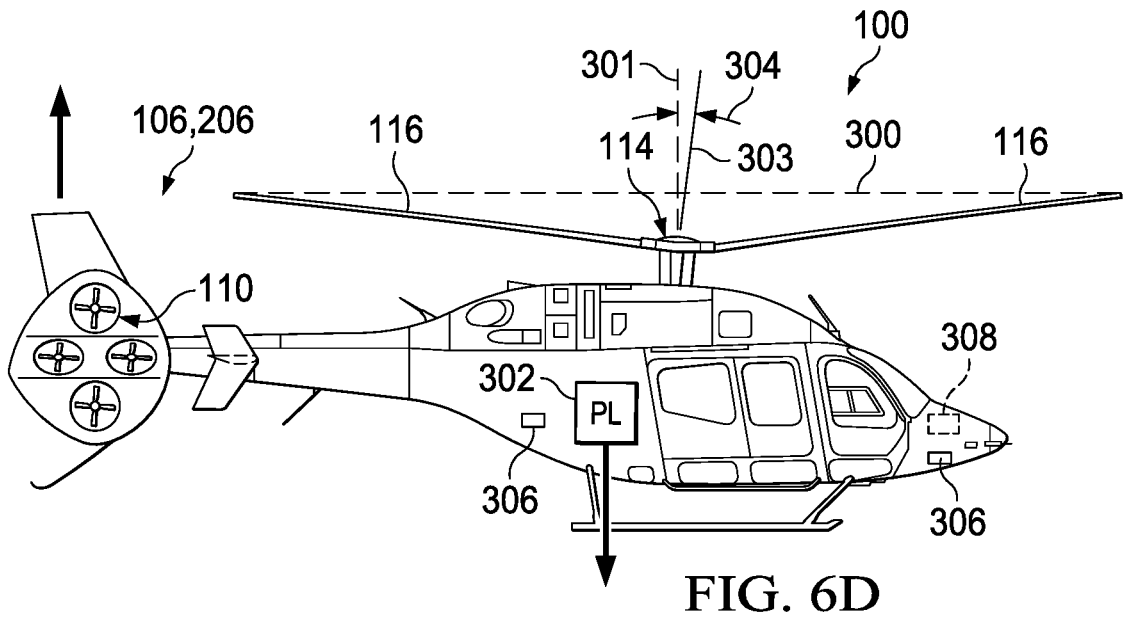
FIG. 6D is a simplified diagram of the helicopter of FIG. 1 operating in the aft loaded state with a tail rotor assembly of the helicopter operating to apply additional tail lift in order to recover available cyclic control, increase payload capacity, and minimize forward flapping of the main rotor system of the helicopter and achieve a forward flight condition.

As shown in FIG. 6C, the pilot has provided a forward cyclic control input to return the rotor tip path plane 300 to horizontal. This alleviates the rearward drift that would result in FIG. 6B without cyclic input from the pilot. At this point, and as shown in FIG. 6D, the canted fans of the tail rotor assembly 106, 206 may be operated to generate additional thrust, thereby providing lift to the tail boom 104 in order to react to the additional or shifted payload 302 and restore the pitch of the helicopter 100 to a more nose-level attitude without requiring the additional forward cyclic control input needed to maintain the hovering state shown in FIG. 6C, thereby restoring the available cyclic control and reducing the amount of flapping. When the thrust of the canted fans of the tail rotor assembly 106, 206 is increased, additional anti-torque thrust is also provided by the canted fans. Thus, the anti-torque thrust generated by the normal fans of the tail rotor assembly 106, 206 may be decreased to regulate the amount of anti-torque thrust generated by the tail rotor assembly 106, 206. Control of thrust sharing between the canted fans and the normal fans may be controlled manually by a pilot of the helicopter 100 and/or automatically by a flight control system 308 of helicopter 100. Further, in some embodiments, the canted fans and the normal fans may be automatically controlled by the flight control system 308 in response to the center of gravity and/or a change in the center of gravity detected by sensors 306 to mitigate excessive flapping or to keep the aircraft in a more desirable pitch attitude.

Control of the canted fans and the normal fans, manually or automatically, allows the pitch attitude of helicopter 100 to be manipulated, while also regaining the cyclic control margin and reducing or preferably altogether eliminating flapping of the main rotor blades 116 relative to the rotor mast axis 303 of the main rotor system 114. Providing additional lift while balancing the anti-torque thrust provides the capability and flexibility of increased payload capacity and/or carrying additional rear-seated passengers. Furthermore, since flapping of the main rotor blades 116 relative to the rotor mast axis 303 of the main rotor system 114 is reduced or preferably eliminated, the main rotor system 114 may use simpler hub designs (e.g., flexure hubs). Still further, using the tail rotor assembly 106, 206 to control pitch attitude in this manner when the center of gravity of helicopter 100 shifts rearward may allow better pilot visibility of the ground ahead of the helicopter 100, especially if helicopter 100 comprised a conventional design resulting in a nose-up pitch attitude when the center of gravity shifts rearward.

Figure 6E:
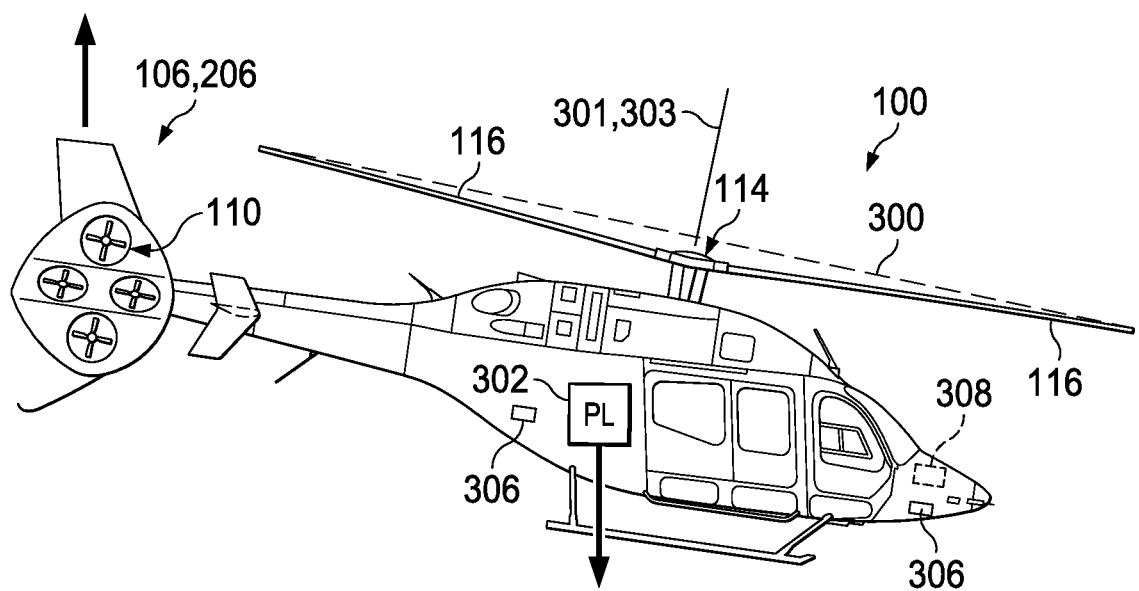
FIG. 6E is a simplified diagram of the helicopter of FIG. 1 operating in the aft loaded state with the tail rotor assembly of the helicopter operating to apply additional tail lift in order to orient the helicopter in a more nose-down orientation for forward flight.

As shown in FIG. 6E, the canted fans of the tail rotor assembly 106, 206 are operated to generate additional thrust, thereby providing additional lift to the tail boom 104 in order to orient the helicopter 100 in a more nose-down orientation for forward flight. Accordingly, the anti-torque thrust generated by the normal fans of the tail rotor assembly 106, 206 may be further decreased to regulate the total amount of anti-torque thrust generated by the tail rotor assembly 106, 206. In some embodiments, by providing sufficient lift to the tail boom 104 to orient the helicopter 100 nose-down, the canted fans of the tail rotor assembly 106, 206 may also provide sufficient anti-torque thrust to prevent rotation of the fuselage 102 when the main rotor 114 is operated without contribution from the normal fans of the tail rotor assembly 106, 206. Thus, in some embodiments, when a nose-down orientation is implemented, the normal fans of the tail rotor assembly 106, 206 may not be operated, or alternatively, may be operated at a minimal rotational speed. The nose-down orientation may generally be beneficial to an attack helicopter 100 application. The tail rotor assembly 106, 206 may therefore provide helicopter 100 with pitch control that enables helicopter 100 to orient nose-down when performing ground reconnaissance or a ground-targeted attack. Thus, in some embodiments, helicopter 100 may be pitched forward in a nose-down orientation manually by a pilot and/or automatically by flight control system 308 in response to activation of a weapons system or other input from the pilot.

While the embodiments shown depict helicopter 100, it will be appreciated that the tail rotor assemblies 106, 206 may be used in any other aircraft and/or rotorcraft that utilizes a tail rotor and/or requires anti-torque thrust and lift. This is applicable to both "manned" and "un-manned" aircraft. Additionally, it will be appreciated that the tail rotor assemblies 106, 206 may be retrofit with existing aircraft and/or rotorcraft. Still further, depending on the rotational direction of the main rotor system 114, the tail rotor assemblies 106, 206 may be configured to provide anti-torque thrust in any direction to counter the torque produced by the main rotor 108 while also providing lift to the tail boom 104 of the helicopter 100 when the helicopter 100 takes on additional payload 302 or when a nose-down orientation of helicopter 100 is required.

Figure 7:
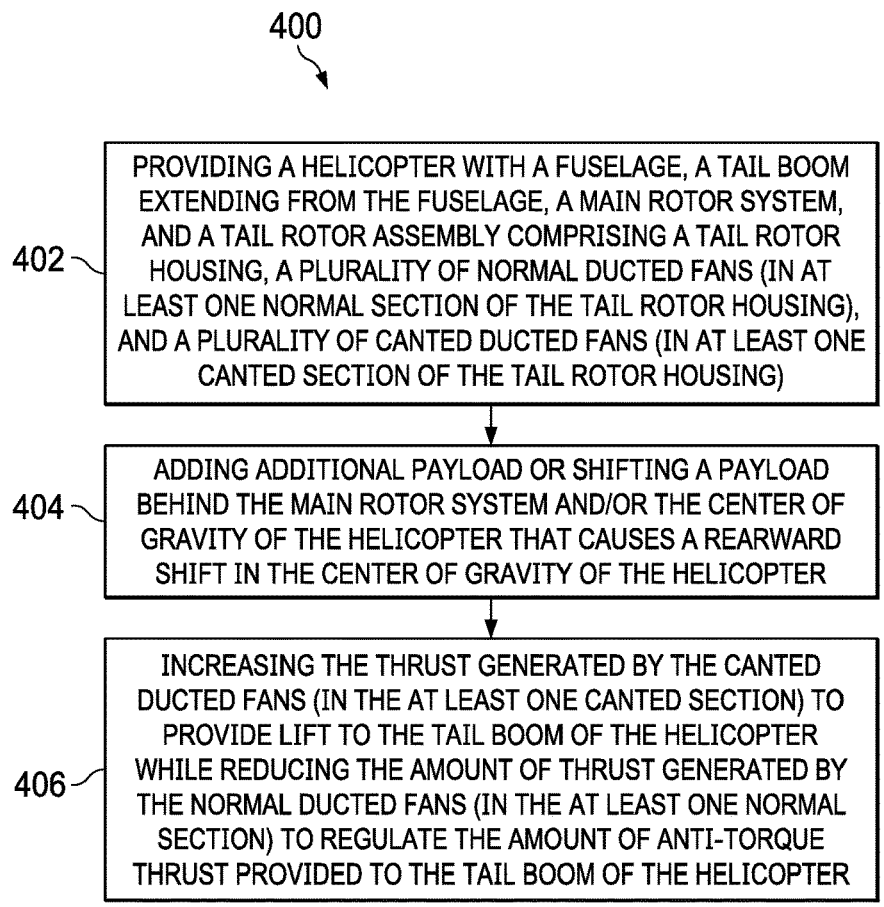
FIG. 7 is a flowchart of a method of operating a helicopter according to this disclosure.

Referring now to FIG. 7, a flowchart of a method 400 of operating a helicopter 100 is shown. Method 400 begins at block 402 by providing a helicopter 100 with a fuselage 102, a tail boom 104 extending from the fuselage 102, a main rotor system 114, and a tail rotor assembly 106, 206 comprising a plurality of normal ducted fans 110 (in at least one normal section 120, 140, 230 of the tail rotor housing 108) and a plurality of canted ducted fans 110 (in at least one canted section 130, 220, 240 of the tail rotor housing 108). Method 400 continues at block 404 by adding additional payload 302 or shifting the payload 302 behind the main rotor system 114 and/or the center of gravity of the helicopter 100 that causes a rearward shift in the center of gravity of the helicopter 100. Method 400 concludes at block 406 by increasing the thrust generated by the canted ducted fans 110 (in the at least one canted section 130, 220, 240 of the tail rotor housing 108) to provide lift to the tail boom 104 of the helicopter 100 while reducing the amount of thrust generated by the normal ducted fans 110 (in the at least one normal section 120, 140, 230 of the tail rotor housing 108) to regulate the amount of anti-torque thrust provided to the tail boom 104 of the helicopter 100. This allows the pitch attitude of helicopter 100 to be manipulated, while also regaining the cyclic control margin and reducing or preferably altogether eliminating flapping of the main rotor blades 116 relative to the rotor mast axis 303 of the main rotor system 114, while also maintaining the requisite amount of anti-torque thrust provided by the tail rotor assembly 106, 206 in order to prevent rotation of the fuselage 102 when the main rotor system 114 is operated during hover, lateral maneuvering, and/or forward flight.

Figure 8:
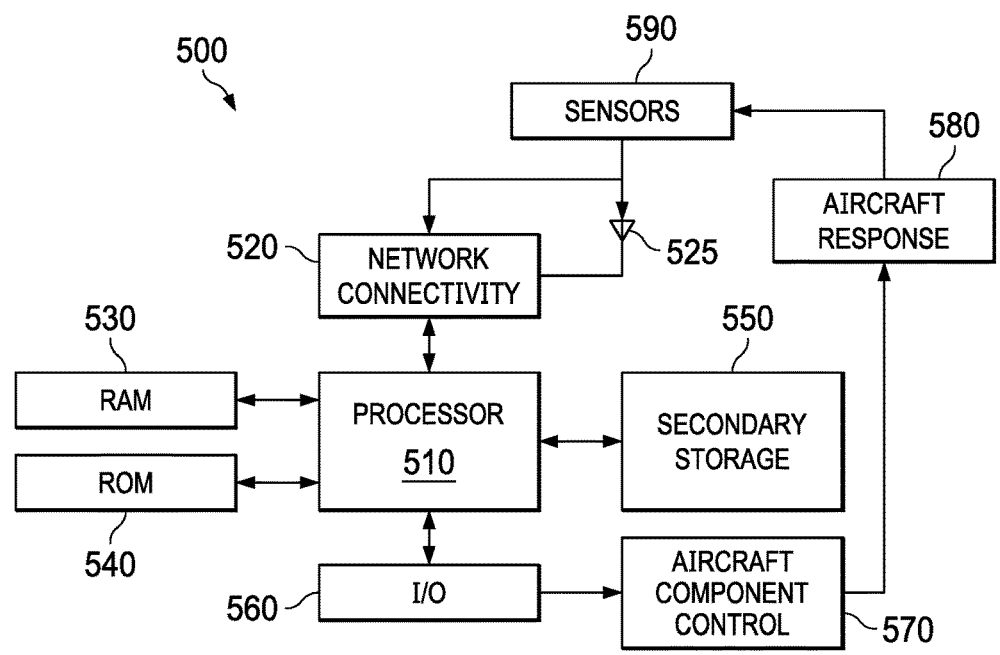
FIG. 8 is a schematic diagram of a general-purpose processor (e.g. electronic controller or computer) system suitable for implementing the embodiments of this disclosure.

Referring now to FIG. 8, a schematic diagram of a general-purpose processor (e.g. electronic controller or computer) system 500 suitable for implementing the embodiments of this disclosure is shown. System 500 that includes a processing component 510 suitable for implementing one or more embodiments disclosed herein. In particular, one or more of the flight control systems (e.g., flight control system 308 of helicopter 100) and/or other electronic systems (sensors 306) disclosed herein may comprise one or more systems 500. In addition to the processor 510 (which may be referred to as a central processor unit or CPU), the system 500 might include network connectivity devices 520, random access memory (RAM) 530, read only memory (ROM) 540, secondary storage 550, and input/output (I/O) devices 560. System 500 may also comprise aircraft component controls 570 (e.g., for tail assembly 106 to provide lift and anti-torque), aircraft responses 580 (e.g., cyclic control, pitch attitude), and sensors 590 (e.g., sensors 306) In some cases, some of these components may not be present or may be combined in various combinations with one another or with other components not shown. These components might be located in a single physical entity or in more than one physical entity. Any actions described herein as being taken by the processor 510 might be taken by the processor 510 alone or by the processor 510 in conjunction with one or more components shown or not shown in the system 500. It will be appreciated that the data described herein can be stored in memory and/or in one or more databases.

The processor 510 executes evaluations, instructions, codes, computer programs, or scripts that it might access from the network connectivity devices 520, RAM 530, ROM 540, secondary storage 550 (which might include various disk-based systems such as hard disk, floppy disk, optical disk, or other drive), and/or sensors 590. While only one processor 510 is shown, multiple processors may be present. Thus, while instructions may be discussed as being executed by processor 510, the instructions may be executed simultaneously, serially, or otherwise by one or multiple processors 510. The processor 510 may be implemented as one or more CPU chips and/or application specific integrated chips (ASICs).

The network connectivity devices 520 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 520 may enable the processor 510 to communicate with sensors 590, the Internet, or one or more telecommunications networks or other networks from which the processor 510 might receive information or to which the processor 510 might output information.

The network connectivity devices 520 might also include one or more transceiver components 525 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 525 might include separate receiving and transmitting units or a single transceiver. Information transmitted or received by the transceiver 525 may include data that has been processed by the processor 510 or instructions that are to be executed by processor 510. Such information may be received from and outputted to a network in the form, for example, of a computer data baseband signal or signal embodied in a carrier wave. The data may be ordered according to different sequences as may be desirable for either processing or generating the data, transmitting or receiving the data, and/or controlling the ducted fans 110 for desired pitch attitude and anti-torque thrust. The baseband signal, the signal embedded in the carrier wave, or other types of signals currently used or hereafter developed may be referred to as the transmission medium and may be generated according to several methods well known to one skilled in the art.

The RAM 530 might be used to store volatile data and perhaps to store instructions that are executed by the processor 510. The ROM 540 is a non-volatile memory device that typically has a smaller memory capacity than the memory capacity of the secondary storage 550. ROM 540 might be used to store instructions and perhaps data that are read during execution of the instructions. Access to both RAM 530 and ROM 540 is typically faster than to secondary storage 550. The secondary storage 550 is typically comprised of one or more disk drives or tape drives and might be used for non-volatile storage of data or as an over-flow data storage device if RAM 530 is not large enough to hold all working data. Secondary storage 550 may be used to store programs or instructions that are loaded into RAM 530 when such programs are selected for execution or information is needed.

The I/O devices 560 may include liquid crystal displays (LCDs), touchscreen displays, keyboards, keypads, switches, dials, mice, track balls, voice recognizers, card readers, paper tape readers, printers, video monitors, transducers, sensors (e.g., sensors 306 of helicopter 100), motor drive electronics, or other well-known input or output devices. Also, the transceiver 525 might be considered to be a component of the I/O devices 560 instead of or in addition to being a component of the network connectivity devices 520. Some or all of the I/O devices 560 may be substantially similar to various components disclosed herein and/or may be components of any of the flight control systems (e.g., flight control system 308 of helicopter 100) and/or other electronic systems disclosed herein. Further, inputs provided through an I/O device 560, such as flight control system 308, may communicate with aircraft component control 570, which may include control for the ducted fans 110 of tail assembly 106. Thus, flight control system 308 may provide control signals to the ducted fans 110 to achieve a computer lift and/or anti-torque thrust. Feedback via aircraft response 580 and/or sensors 590 (e.g., sensors 306, flapping sensors, etc.) may further communicate through one or more of the network connectivity devices 520 and/or one or more transceiver components 525 to provide feedback in order to control pitch and/or pitch attitude of helicopter 100.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A helicopter, comprising:
   a fuselage;
   a tail boom extending from the fuselage;
   a main rotor system; and
   a tail rotor assembly disposed on an aft end of the tail boom, comprising:
      a tail rotor housing; and
      at least one substantially vertical ducted fan disposed in the tail rotor housing and configured to generate anti-torque thrust to prevent rotation of the fuselage when the main rotor is operated; and
      at least one canted ducted fan disposed in the tail rotor housing and configured to generate both anti-torque thrust to prevent rotation of the fuselage when the main rotor is operated and lift to the tail boom in order to control pitch of the helicopter;
      wherein the at least one substantially vertical ducted fan and the at least one canted ducted fan comprise axes of rotations that are substantially fixed relative to each other.

2. The helicopter of claim 1, wherein the at least one substantially vertical ducted fan and the at least one canted ducted fan are electric fans.

3. The helicopter of claim 1, wherein the tail rotor housing comprises an upper normal section comprising at least one substantially vertical ducted fan, a middle canted section comprising the at least one canted ducted fan, and a lower normal section comprising at least one substantially vertical ducted fan.

4. The helicopter of claim 1, wherein the tail rotor housing comprises an upper canted section comprising at least one canted ducted fan, a middle normal section comprising the at least one substantially vertical ducted fan, and a lower canted section comprising at least one canted ducted fan.

5. The helicopter of claim 1, wherein a rotational speed of the at least one substantially vertical ducted fan and the at least one canted ducted fan are independently controlled.

6. The helicopter of claim 5, wherein the at least one substantially vertical ducted fan and at least one canted ducted fan are controlled by at least one of (1) manually by a pilot of the helicopter and (2) automatically by a control system of the helicopter.

7. The helicopter of claim 6, wherein the at least one substantially vertical ducted fan and the at least one canted ducted fan are at least one of (1) automatically controlled in response to the center of gravity of the helicopter and (2) initiated by a pilot to control pitch attitude of the helicopter.

8. The helicopter of claim 6, wherein when additional lift to the tail boom is required to pitch the helicopter forward, thrust generated by the at least one canted ducted fan is increased and thrust generated by the at least one substantially vertical ducted fan is decreased to maintain a required level of anti-torque thrust.

9. The helicopter of claim 8, wherein generating additional lift with the at least one canted ducted fan while maintaining the required level of anti-torque thrust increases payload capacity of the helicopter.

10. The helicopter of claim 9, wherein the at least one canted ducted fan is configured to generate sufficient lift to the tail boom in order to prevent a nose-up orientation of the helicopter when the center of gravity of the helicopter is shifted rearward behind the main rotor system.

11. The helicopter of claim 10, wherein the at least one canted ducted fan is configured to generate sufficient lift to the tail boom in order to orient the helicopter in a nose-down orientation.

12. A tail rotor assembly for a helicopter, comprising:
a tail rotor housing; and
at least one substantially vertical ducted fan disposed in the tail rotor housing and configured to generate anti-torque thrust; and
at least one canted ducted fan disposed in the tail rotor housing and configured to generate both anti-torque thrust and lift to a tail boom in order to control pitch of a helicopter;
wherein the at least one substantially vertical ducted fan and the at least one canted ducted fan comprise axes of rotations that are substantially fixed relative to each other.

13. The tail rotor assembly of claim 12, wherein the number of substantially vertical ducted fans and the number of canted ducted fans are equal.

14. The tail rotor assembly of claim 12, wherein a rotational speed of the at least one substantially vertical ducted fan and the at least one canted ducted fan are independently controlled at least one of (1) manually by a pilot of the helicopter and (2) automatically by a control system of the helicopter.

15. The tail rotor assembly of claim 14, wherein when additional lift to the tail boom is required to pitch the helicopter forward, thrust generated by the at least one canted ducted fan is increased and thrust generated by the at least one substantially vertical ducted fan is decreased to maintain a required level of anti-torque thrust.

16. The tail rotor assembly of claim 15, wherein the at least one canted ducted fan is configured to generate sufficient lift to the tail boom in order to prevent a nose-up orientation of the helicopter when the center of gravity of the helicopter is shifted rearward.

17. The tail rotor assembly of claim 14, wherein the at least one canted ducted fan is configured to generate sufficient lift to the tail boom in order to orient the helicopter in a nose-down orientation.

18. A method of operating a helicopter, comprising:
providing a helicopter with a fuselage, a tail boom extending from the fuselage, a main rotor system, and a tail rotor assembly comprising a tail rotor housing, at least one substantially vertical ducted fan, and at least one canted ducted fan;
adding additional payload or shifting the payload that causes a shift in the center of gravity of the helicopter;
adjusting the thrust generated by the at least one canted ducted fan to alter lift to the tail boom of the helicopter while adjusting the thrust generated by the at least one substantially vertical ducted fan to regulate the amount of anti-torque thrust provided to the tail boom of the helicopter;
wherein the at least one substantially vertical ducted fan and the at least one canted ducted fan comprise axes of rotations that are substantially fixed relative to each other.

19. The method of claim 18, wherein the adjusting the thrust generated by the at least one canted ducted fan and the adjusting the amount of thrust generated by the at least one substantially vertical ducted fan are at least one of (1) automatically initiated in response to a change in the center of gravity of the helicopter and (2) initiated by a pilot to control pitch attitude of the helicopter.

20. The method of claim 18, further comprising: reducing the payload or shifting the payload that causes a forward shift in the center of gravity of the helicopter; and reducing the thrust generated by the at least one canted ducted fan to reduce lift to the tail boom of the helicopter while increasing the amount of thrust generated by the at least one substantially vertical ducted fan to maintain the amount of anti-torque thrust provided to the tail boom of the helicopter.

* * * * *